Patented June 30, 1953

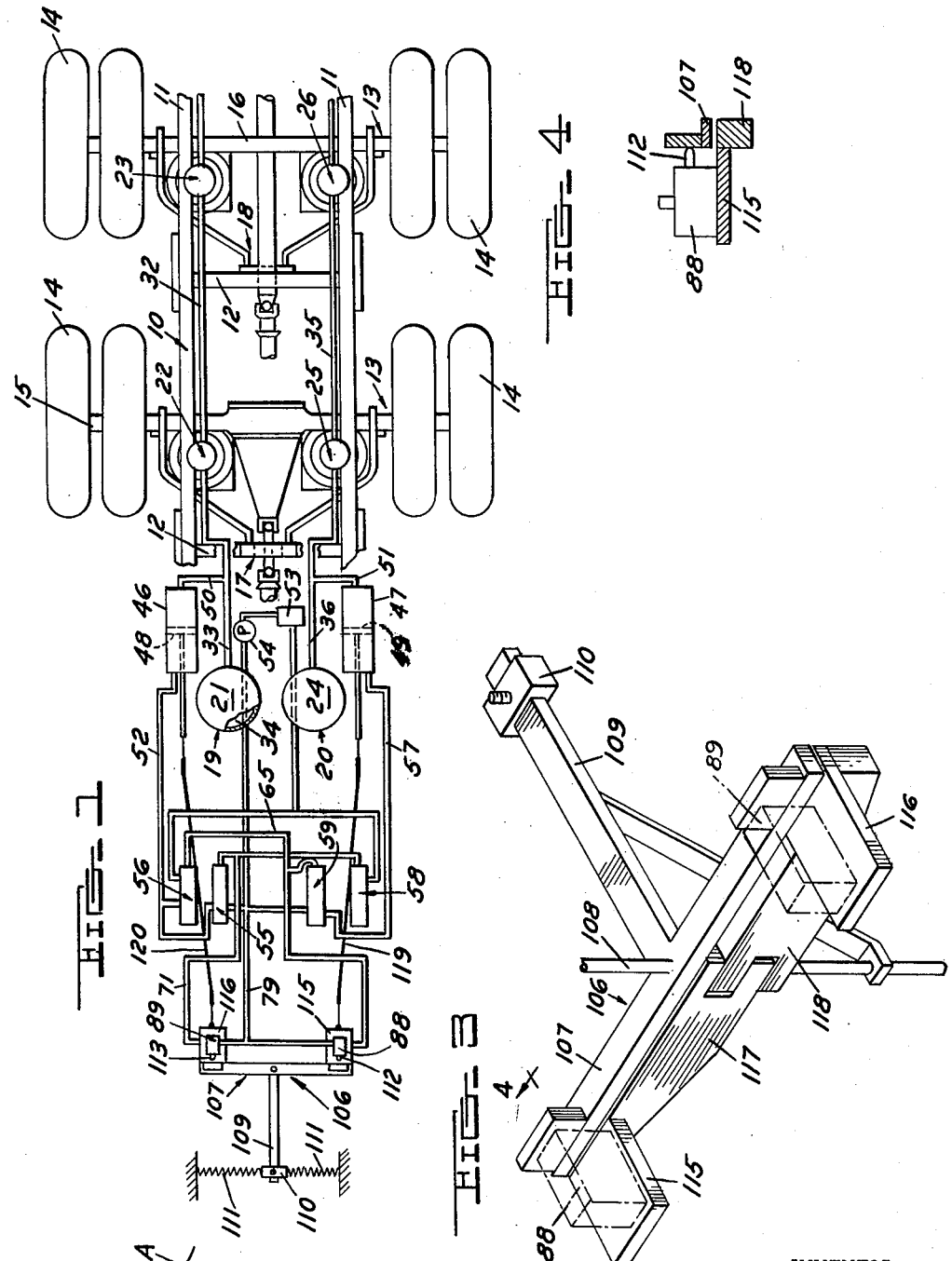

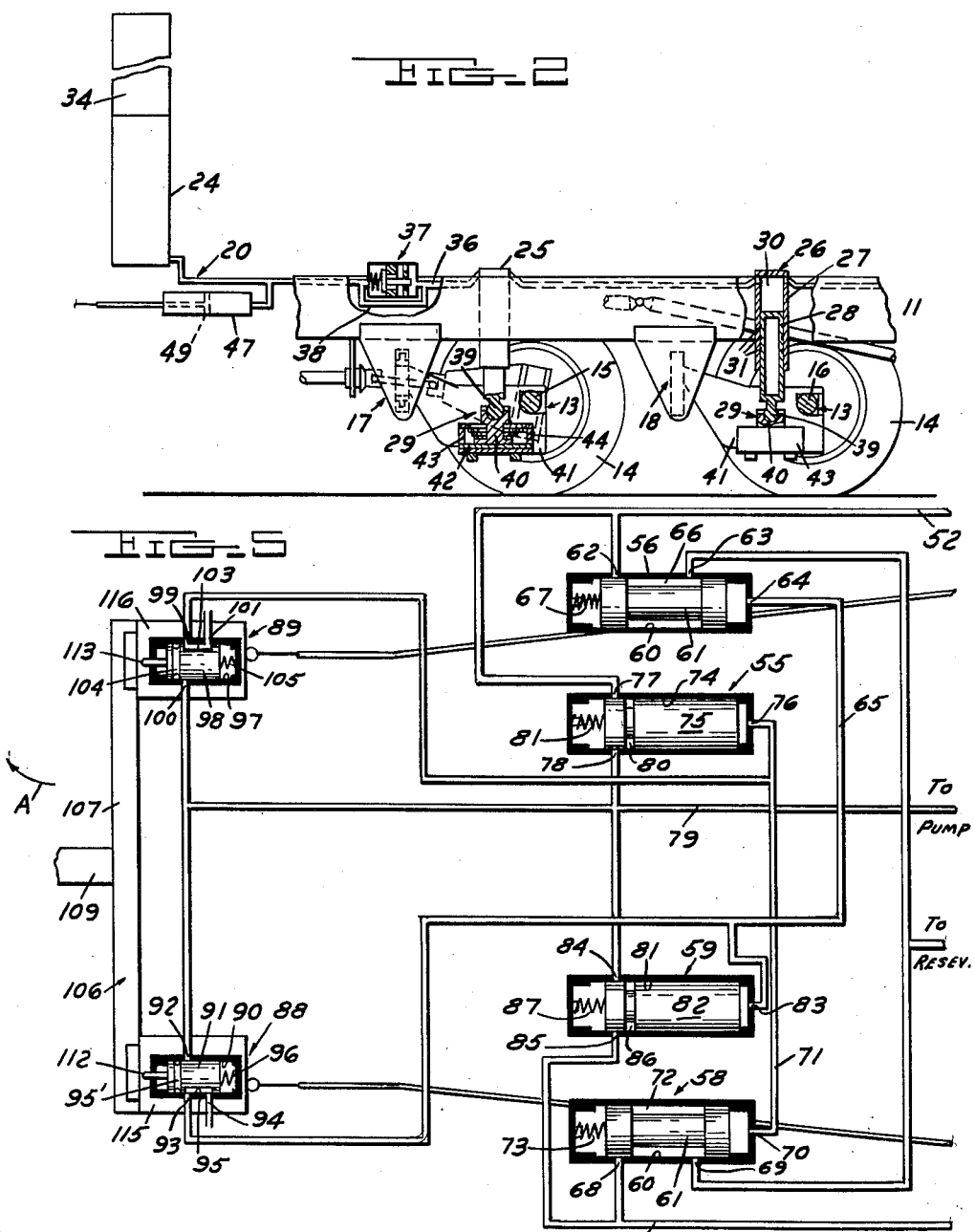

2,643,896

UNITED STATES PATENT OFFICE 2,643,896

SUSPENSION FOR ROAD VEHICLES

Ancil C. Stover, Van Wert, Ohio, assignor to William W. Eisenhauer, William P. Ellwood, Ida J. Eisenhauer, and Leigh E. Eisenhauer, copartners, doing business as The Eisenhauer Manufacturing Company, Van Wert, Ohio Application November 14, 1949, Serial No. 127,072

5 Claims. (Cl. 280—112)

This invention relates to road vehicles having ground engaging wheels and having a frame supported on the wheels by suspension means enabling relative movement of the wheels and frame in directions toward and away from each other.

When vehicles of the above general type are turned in one direction or the other from a straight line course of travel, centrifugal force tends to roll or tip the frame in a direction toward the outer side of the turning radius. The extent to which the frame rolls depends largely on the rate of travel of the vehicle when the turn is negotiated, and under some conditions, may reach dangerous proportions.

In any case rolling or tipping movement of the vehicle chassis frame toward the outer side of the turning radius detracts from the stability of the vehicle and it is an object of this invention to counteract the action of centrifugal force with an opposing force which actually tips or rolls the frame toward the inner side of the turning radius and provides a "banking effect."

In accordance with the present invention opposite sides of the frame are respectively connected to the axle supporting the ground engaging wheels by fluid displacement devices having spaces which vary in volume in response to relative movement of the frame and axle in an up and down direction. The variable volume spaces at opposite sides of the vehicle respectively communicate with expansible chambers, which are alternatively expanded and contracted in response to the centrifugal force developed by turning the vehicle in either direction from a straight line course of travel.

It is another object of this invention to provide an arrangement of the above general type, wherein turning movement of the vehicle in either direction from a straight line course of travel displaces fluid medium into the variable volume space or spaces at the side of the vehicle negotiating the outer radius of the turn by contracting or reducing the volume of the expansible chamber communicating with the latter space or spaces. The other expansible chamber is enlarged in volume to receive fluid medium displaced from the variable volume space or spaces at the side of the vehicle negotiating the inner radius of the turn. As a result of the above arrangement the chassis frame is actually tipped toward the inner side of the turning radius with a force which is proportional to the centrifugal force opposing such tipping or rolling movement.

It is still another object of this invention to provide a construction of the above type wherein the displacement devices actually serve as the suspension means for supporting the frame on the axle or axles.

It is a further object of this invention to provide expansible chambers in the form of cylinders having pistons respectively slidably supported therein, and having the end portions at one side of the pistons respectively communicating with the variable volume spaces of the displacement devices at opposite sides of the frame. The portions of the cylinders at the opposite sides of the pistons therein are alternatively connected to a source of fluid under pressure and to a reservoir by hydraulic systems including valve means.

It is still another object of this invention to provide a pair of actuators for alternatively operating the valve means to respectively connect the source of supply and reservoir to the cylinders. The actuators are in turn operated by a pendulum device having a member or arm pivoted on the frame intermediate the ends for rotation about a substantially vertical axis and having a part responsive to the centrifugal force developed by turning the vehicle in either direction from a straight line course of travel for rotating the arm or member. The actuators are respectively located in positions where they are alternatively engaged by the arm as the latter rotates in opposite directions.

It is still a further object of this invention to support the actuators for rotation about the axis of rotation of the pendulum arm and to respectively connect the actuators to the pistons in the cylinders aforesaid, so that the actuators maintain practically the same relative positions with respect to the arm during rotative movement of the latter.

The foregoing as well as other objects will be made more apparent as this description proceeds, especially when considered in connection with the accompanying drawings, wherein:

Figure 1 is a semi-diagrammatic plan view of a vehicle embodying the present invention;

Figure 2 is a fragmentary side elevational view of the vehicle shown in Figure 1;

Figure 3 is a perspective view of a part of the vehicle shown in Figure 1;

Figure 4 is a sectional view taken substantially on the line 4—4 of Figure 3; and Figure 5 is a diagram showing a part of the fluid displacement systems incorporated in the present invention.

It will become apparent as this description proceeds that the present invention may be successfully used to maintain substantial equilibrium of the chassis frame of various different types of vehicles, regardless of the specific suspension means employed, and regardless of the number of axles provided. However, for the purpose of illustrating the present invention, I have selected a vehicle comprising a frame 10 having side sills 11 secured in lateral spaced relationship by means of cross braces 12.

The frame 10 is supported on axles 13 having ground engaging wheels 14 suitably supported at opposite ends thereof. The axles 13 extend transversely of the frame 10 and are spaced from each other in the direction of length of the frame, as shown in Figure 1 of the drawings.

One of the axles 15 is a driving axle, and the other axle 16 is an idler axle. The driving axle 15 is connected to one of the cross bars 12 of the frame 10 by a mounting 17 and the idler axle 16 is connected to another of the crossbars 12 by a mounting 18. The mounting 17 may be of the double trunnion type which, in addition to permitting turning movement of the axle 15 about a substantially vertically extending axis also permits the axle to move vertically and to tip in a substantially vertical plane relative to the frame. The mounting 18 may be of the single trunnion type which permits vertical displacement of the axle 16 and enables this axle to tip in a substantially vertical plane. These mountings ae shown and described in detail in my copending application Serial No. 119,223, filed October 3, 1949. The mountings form no part of the present invention, and accordingly, are not described in detail herein.

The suspension arrangement shown herein for supporting the frame 10 on the axles 13 forms the subject matter of my copending application Serial No. 127,071, filed November 14, 1949, although it will be understood as this description proceeds that other types of suspension may be employed. Briefly the suspension arrangement comprises two independent hydraulic systems 19 and 20. The suspension system 19 comprises a reservoir 21, a first hydraulic displacement device 22 and a second hydraulic displacement device 23. The suspension system 20 also comprises a reservoir 24, a first displacement device 25 and a second hydraulic displacement device 26.

The devices 22 and 23 respectively connect one side of the frame 10 to the corresponding end portions of the axles 13 while the devices 25 and 26 respectively connect the opposite side of the frame 10 to the adjacent end portions of the axles 13. Each displacement device comprises a cylinder 27 and a piston 28, slidably supported within the cylinder. The upper end of the cylinder 27 of each device is closed, and is connected to the frame. The lower end of the cylinder 27 is open to receive the piston 28, and the latter is connected to the axle by a coupling 29. The piston in each cylinder 27 forms with the latter a space 30 at the top of the piston, and suitable sealing rings 31 are carried by the piston to prevent the escape of fluid medium from the space 30 past the piston.

The above arrangement is such that the spaces 30 decrease in volume in response to relative movement of the frame and axles toward one another, and increase in volume upon relative movement of the frame and axles in directions away from one another. These spaces are filled with a non-compressible fluid medium, and the spaces 30 for the devices 22 and 23 are connected by a conduit 32. Also the space 30 in the device 22 is connected to the bottom of the reservoir 21 by a conduit 33. Thus the spaces 30 for the displacement devices at one side of the frame 10 are serially connected to the reservoir 21. The reservoir 21 contains a supply of non-compressible fluid medium, and a yielding pressure is applied to the fluid medium in the reservoir 21 by pneumatic pressure contained in the chamber 34 in the reservoir 21 above the level of the non-compressible fluid medium.

The spaces 30 of the displacement devices 25 and 26 are connected by a conduit 35, and the space 30 of the device 25 is connected to the bottom of the reservoir 24 by a conduit 36. The reservoir 24 contains a supply of non-compressible fluid medium and has a chamber at the top similar to the chamber 34 in that it also contains air under sufficient pressure to maintain the spaces 30 of the devices 25 and 26 filled with non-compressible fluid medium.

It follows from the above that relative movement of the frame 10 and axles 13 in directions toward one another reduces the volume of the spaces 30, and displaces fluid from these spaces into the reservoirs 21 and 24. The fluid medium within the reservoirs is under the yielding pressure applied by the air within the upper end of the reservoirs, so that fluid flows from the reservoirs to the spaces 30 in response to increasing the volume of these spaces, or in response to relative movement of the frame and axles in directions away from one another. If desired return flow of fluid from the reservoirs to the spaces 30 may be restricted in order to control the rebound action of the frame. This may be accomplished by inserting a check valve 37 and a bypass 38 in each system 19 and 20.

It has been briefly described above that the axles 13 are connected to the frame by mountings which are of a design to permit various angular movements of the axles relative to the frame 10. Such movements of the axles are permitted without applying undue stresses to the displacement devices by the couplings 29 between the devices and axles. All of the couplings are identical in construction, and a description of one will suffice for all. As shown in Figure 2 of the drawings the coupling 29 comprises a ball part 39, and a socket part 40 forming a seat for the ball part. The socket part 40 is supported on a bracket 41 mounted on an axle and having a wear plate 42 disposed in a substantially horizontal plane. The socket part 40 is seated on the wear plate 42 for sliding movement relative to the bracket in all directions parallel to the plane of the wear plate. This sliding movement, when combined with the universal pivotal movement provided by the ball part 39 enables relatively free displacement of the associated axle without overstressing the displacement devices. Referring again to Figure 2 of the drawings the lower end portion of the socket part 40 is enclosed in a housing 43 having the top wall apertured to permit free passage of the part 40 therethrough. Suitable superposed rings 44 are positioned between the lower end of the socket part 40, and the top wall of the housing for maintaining the part 40 in bearing contact with the wear plate 42. The rings 44 slidably engage one another to permit lateral shifting movement of the socket part 40 on the wear plate 42.

Supported on the frame 10 at opposite sides thereof is a pair of cylinders 46 and 47 respectively having pistons 48 and 49 slidably supported therein. The portions of the cylinders at the rear sides of the pistons are respectively connected to the conduits 33 and 36 by conduits 50 and 51. A conduit 52 is connected to the cylinder 46 at the front side of the piston 48, and provision is made for alternatively connecting the conduit 52 to a reservoir 53 and a source of fluid under pressure comprising a pump 54. The flow of fluid medium through the conduit 52 is controlled by a feed valve 55 and an unloading valve 56.

The end of the cylinder 47 at the front side of the piston 49 therein is connected to a conduit 57. The conduit 57 is also alternatively connected to the reservoir 53 and pump 54 by an unloading valve 58 and a feed valve 59.

As shown in Figure 5 of the drawings the unloading valves are each provided with a chamber 60 and a valve member 61 supported in the chamber for sliding movement. The chamber 60 of the valve 56 has longitudinally spaced ports 62 and 63 respectively connected to the front end of the cylinder 46 and reservoir 53. The chamber 60 for the valve 56 has a port 64 at the rear end which communicates with a supply conduit 65. The ports 62 and 63 are adapted to be connected by a recess 66 formed in the side of the valve member 61. The valve member 61, however, is normally held in its rearwardmost position wherein the recess 66 is out of registration with the port 62, and this is accomplished by a spring 67 acting upon the front end of the valve member 61.

The chamber 60 for the unloading valve 58 is also provided with longitudinally spaced ports 68 and 69 which respectively communicate with the front end of the cylinder 47 and with the reservoir 53. A third port 70 is provided at the rear end of the chamber 60 for the unloading valve 58, and this port is connected to a supply conduit 71. The ports 68 and 69 are adapted to be connected by a recess 72 formed in one side of the valve member 61. The valve member 61 for the unloading valve 58 is normally held in a position wherein the recess 72 is out of registration with the port 68, and this is accomplished by a spring 73 acting upon the front end of the valve member.

The feed valve 55 comprises a chamber 74 and a valve plunger 75 slidably supported in the chamber 74. The chamber 74 has a port 76 at the rear end which communicates with the supply conduit 71, and is also provided with diametrically opposed ports 77 and 78 adjacent the front end thereof. The port 77 communicates with the conduit 52, and the port 78 is connected to the pressure conduit 79 leading from the pump 54. The valve member 75 has an annular groove 80 which connects the ports 77 and 78 upon forward movement of the plunger 75. The plunger 75 is normally held by a spring 81 in a position wherein the groove 80 is out of registration with the ports 77 and 78, so that these ports are normally closed.

The feed valve 59 comprises a chamber 81 and a valve plunger 82 slidably supported in the chamber. The chamber 81 has a port 83 at the rear end which communicates with the supply conduit 65, and has a pair of diametrically opposed ports 84 and 85 adjacent the front end thereof. The port 84 is connected to the pressure conduit 79 and the port 85 is connected to the conduit 57. The valve plunger 82 has an annular groove 86 which serves to connect the ports 84 and 85 when the plunger 82 is in its forwardmost position. A spring 87 acts on the front end of the plunger to normally locate the latter in its rearwardmost position wherein the annular groove 86 is out of registration with the ports 84 and 85.

The feed and unloading valves previously described are actuated by a pair of pilot valves 88 and 89. The pilot valve 88 has a chamber 90 and a valve member 91 slidably supported in the chamber. The chamber 90 has diametrically opposed ports 92 and 93 respectively connected to the pressure conduit 79 and the supply line 65. A third port 94 in the valve chamber 90 is connected to the reservoir 53. The valve plunger 91 has a recess 95 for connecting the ports 93 and 94 in the closed position of the valve shown in Figure 5 of the drawings. In addition the valve plunger has an annular groove 95′ which serves to connect the ports 92 and 93 when the valve plunger 91 is moved rearwardly against the action of a spring 96.

The pilot valve 89 has a chamber 97 and a valve plunger 98 supported in the chamber for sliding movement. The chamber 97 has diametrically opposed ports 99 and 100 respectively connected to the supply conduit 71 and to the pressure conduit 79. A third port 101 is formed in the valve chamber 97, and is connected to the reservoir 53. The valve plunger 98 has a recess 103 which serves to connect the ports 99 and 101 when the plunger is in its normal or closed position shown in Figure 5 of the drawings. The valve plunger also has an annular recess 104 arranged to connect the ports 99 and 100 when the plunger 98 is moved rearwardly against the action of the spring 105.

The pilot valves are alternatively operated in response to turning movement of the vehicle in opposite directions from a straight line course of travel by a pendulum device 106. The pendulum device 106 has an arm 107 which extends in a direction transversely of the vehicle frame 10 and is pivoted intermediate the ends on a pin 108 for swinging movement about a substantially vertical axis. Projecting forwardly from the center of the arm 107 is a member 109 having a weight 110 adjustably supported on the extremity thereof. The arrangement is such that when the vehicle is turned in either direction from a straight line course of travel, centrifugal force acts on the weighted end of the member 109 and rocks the arm 107 about the pin 108 in a direction opposite the direction of turning movement of the vehicle.

Swinging movement of the pendulum device from its center as normal position is resisted to some extent by a pair of coil springs 111 suitably supported on the chassis frame with their inner ends respectively positioned at opposite sides of the free end portion of the arm 107. By reason of these springs swinging movement of the pendulum device in either direction is dependent upon the magnitude of the centrifugal force and wandering of the pendulum device from its center position is prevented The pilot valves 88 and 89 are so positioned with respect to the opposite ends of the arm 107 at the rear side of the latter that the valve plungers 91 and 98 are alternatively engaged upon rotation of the arm 107 in opposite directions about the pin 108. In this connection it will be noted that the valve plunger 91 has a part 112 positioned at the front end for engagement by the arm 107, and the valve plunger 98 has a part 113 positioned at the front end for engagement by the arm 107.

With the parts as described above, it will be noted that when the pendulum device 107 is in the position of equilibrium shown in Figures 1 and 5 of the drawings, the pilot valves 88 and 89 are closed. Also the feed valves and the unloading valves are in their relative closed positions. However, assuming that the vehicle is turned in the direction of the arrow A in Figure 1 from a straight line course of travel, it will be noted that the centrifugal force acting on the pendulum device 106 swings the arm 107 in an anti-clockwise direction. As a result the valve plunger 91 of the pilot valve 88 is moved rearwardly against the action of the spring 96 to close the port 94 and to connect the port 92 to the port 93. Inasmuch as the port 92 is connected to the pump 54 through the conduit 79, it follows that fluid under pressure flows through the supply line 65 to the port 63 of the feed valve 59. The feed valve plunger 62 is then moved forwardly against the action of the spring 67 to connect the port 84 with the port 85. Since the port 84 is connected to the pump through the conduit 79, and since the port 85 is connected to the front end of the cylinder 47 through the conduit 57, it follows that fluid under pressure of the pump is admitted to the front side of the cylinder 47. The piston 49 in the cylinder 47 is accordingly moved rearwardly and the non-compressible fluid medium in the cylinder at the rear side of the piston 49 is displaced into the variable volume spaces 30 of the displacement devices 25 and 26. As a result any tendency for the adjacent side of the vehicle frame to drop or tip downwardly is counteracted by the flow of non-compressible fluid medium into the devices 25 and 26.

It will further be noted that the conduit 65 is connected to the port 64 associated with the unloading valve 56 so that the valve plunger 61 of this unloading valve is moved forwardly against the action of the spring 67 to connect the port 62 to the port 63. Inasmuch as the port 62 is connected to the front end of the cylinder 46 and the port 63 is connected to the reservoir 53, it follows that the piston in the cylinder 46 may move forwardly to provide sufficient space in the cylinder 46 at the rear of the piston for accommodating fluid medium displaced by the devices 22 and 23. It follows therefore that the frame 10 of the vehicle is actually tipped toward the inner side of the turning radius and a "banking" effect is obtained.

When the vehicle returns to a straight line course of travel, the pendulum device 106 assumes its position of equilibrium shown in Figures 1 and 5 of the drawings. As a result the pilot valve 88 is again closed to connect the port 94 with the port 93. In other words the supply line 65 is connected to the reservoir enabling the unloading valve 56 and feed valve 59 to return to their normal closed positions.

When the vehicle is turned in a direction opposite the direction indicated by the arrow A, the pilot valve 89 is operated to open the feed valve 55 and the unloading valve 58. As a result the piston 48 in the cylinder 46 is moved in a direction to supply fluid under pressure to the volume spaces 30 of the devices 22 and 23 and downward movement of the adjacent side of the frame 10 is resisted. Also the front end of the cylinder 47 is connected to the reservoir in order to permit fluid medium from the displacement devices 25 and 26 to flow into the cylinder 47 at the rear side of the piston 49. Thus, the frame actually tips or rolls toward the inner side of the turning radius and the desired "banking" effect results.

The extent of angular travel of the pendulum device against the action of either spring 111 depends on the magnitude of the centrifugal force developed and the extent of opening of the pilot valves 88 and 89 increases as the angular travel of the pendulum increases. As a result, the force opposing the centrifugal force may be said to be directly proportional to the centrifugal force within practical limits so that the desired "banking" effect is obtained regardless of the magnitude of the centrifugal force developed.

In order to simplify the mechanism and minimize stresses, the pilot valves 88 and 89 are movable with the pendulum device 106 during rotation of the latter. Upon reference to Figure 3, it will be noted that the pilot valves are respectively supported on pads 115 and 116. These pads are, in turn, respectively secured to the outer ends of arms 117 and 118. The inner ends of the arms are pivoted on the pin 108 for swinging movement independently of each other about the axis of the pin 108. The rear ends of the pads 115 and 116 are respectively connected to the pistons 48 and 49 by flexible mechanical connections 119 and 120. As a result the pilot valves are actually moved by the pistons in the cylinders 46 and 47. However, movement of the pistons is indirectly controlled by the pendulum device 106, so that the pilot valves are maintained in definite relationship with respect to the arm 107 of the pendulum device. This construction simplifies the design of the mechanism and assures accurate operation of the pilot valves by the pendulum device when the vehicle is turned in either direction from a straight line course of travel.

What I claim as my invention is:

1. In a vehicle, a frame, an axle extending transversely of the frame, means supporting the frame on the axle permitting relative movement of the axle and frame toward and away from one another, said supporting means including fluid displacement devices respectively connecting opposite sides of the frame to the axle, each device comprising a cylinder member, a piston member slidably supported in the cylinder member and cooperating with the latter to provide a variable volume space in the cylinder member at one end of the piston member, means operatively connecting one member of each device to the frame, means for connecting the other member of each device to the axle, a pair of reservoirs containing a non-compressible fluid medium under a yielding pressure and respectively communicating with the variable volume spaces of the displacement devices at opposite sides of the vehicle, a pair of cylinders having pistons slidably supported therein and having the ends at one side of the pistons respectively communicating with said reservoirs, a third reservoir and a source of fluid under pressure, and means responsive to turning movement of the vehicle in either direction from a straight line course of travel to alternatively connect the third reservoir and source of fluid under pressure to the end portions of the pair of cylinders at the sides of the pistons opposite the sides aforesaid thereof.

2. In a vehicle, a frame and an axle movable relative to one another in an up and down direction, fluid displacement devices respectively connecting opposite sides of the frame to the axle, each device comprising relatively movable parts respectively connected to the frame and axle and cooperating to provide a space which varies in volume in response to relative movement of the frame and axle in an up and down direction, a member extending in a direction transverse to the frame and pivoted intermediate the ends on the frame for rotation about a substantially vertical axis, means for rotating the member about the vertical axis in response to the centrifugal force developed by turning the vehicle in either direction from a straight line course of travel, a pair of actuating elements supported by the frame in positions to be alternatively engaged by the member upon rotative movement of the latter in opposite directions, and means for supplying fluid under pressure to the variable volume spaces comprising a pair of cylinders having pistons slidably supported therein, means respectively connecting the end portions of the cylinders at one side of the pistons to the variable volume spaces, a reservoir and a source of fluid under pressure, means for alternatively connecting the cylinders at the sides of the pistons opposite the sides aforesaid to the reservoir and source of fluid under pressure including valves respectively operated by said actuating elements, and means for changing the positions of said actuating elements relative to said member in accordance with the movement of said pistons in their respective cylinders.

3. In a vehicle, a frame, a member extending in a direction transverse to the frame and pivoted intermediate the ends on the frame for rotation about a substantially vertically extending axis, means for rotating the member in response to the centrifugal force developed by turning movement of the vehicle in either direction from a straight line course of travel, a pair of actuating elements supported by the frame in positions to be alternatively engaged by the member upon rotation of the latter in opposite directions, a pair of cylinders supported by the frame and having pistons respectively slidably supported therein, a source of fluid under pressure, and valves respectively connecting the source of fluid under pressure to the cylinders and alternatively operated by the actuating elements upon rotation of the member in opposite directions, said actuating elements being supported for pivotal movement independently of one another about the axis of rotation of said member, and said pistons in said cylinders respectively being mechanically connected to said actuating elements.

4. In a vehicle, a frame, an axle extending transversely of said frame, means supporting said frame on said axle permitting relative movement of said axle and frame toward and away from one another, said supporting means including fluid displacement devices respectively connecting opposite sides of said frame to said axle, each device comprising relatively movable parts cooperating to provide a space which varies in volume in response to relative movement of said frame and axle toward and away from one another, a pair of reservoirs containing a non-compressible fluid medium under a yielding pressure and respectively communicating with the variable volume spaces of the displacement devices at opposite sides of the vehicle, a pair of cylinders having pistons slidably supported therein and having the ends at one side of the pistons respectively communicating with said reservoirs, a third reservoir and a source of fluid under pressure, and means responsive to turning movement of the vehicle in either direction from a straight line course of travel to alternatively connect the third reservoir and source of fluid under pressure to the end portions of the pair of cylinders at the sides of the pistons opposite the sides aforesaid thereof.

5. In a vehicle, a frame, an axle extending transversely of said frame, means supporting said frame on said axle permitting relative movement of said axle and frame toward and away from one another, said supporting means including fluid displacement devices respectively connecting opposite sides of said frame to said axle, each device comprising relatively movable parts cooperating to provide a space which varies in volume in response to relative movement of said frame and axle toward and away from one another, a pair of reservoirs containing a non-compressible fluid medium under a yielding pressure and respectively communicating with the variable volume spaces of the displacement devices at opposite sides of the vehicle, means for alternatively introducing or withdrawing fluid respectively into and out of the variable volume spaces of said displacement devices on each side of said frame, means inertially actuated by a turn in the direction of travel of the vehicle controlling said fluid injection and withdrawal means to add fluid to the variable volume space of the displacement device on the outer side of the turn and to withdraw fluid from the variable volume space of the device on the inner side of the turn, a variable volume container in free fluid communication with the variable volume space of each displacement device, and a power actuated means for changing the volumes of said containers controlled by said inertially actuated means.

ANCIL C. STOVER.

References Cited in the file of this patent

UNITED STATES PATENTS

| Number | Name | Date |
| --- | --- | --- |
| 2,073,180 | Rink | Mar. 9, 1937 |
| 2,126,642 | Jones | Aug. 9, 1938 |
| 2,165,617 | Paes et al. | July 11, 1939 |
| 2,247,749 | De Venel | July 1, 1941 |
| 2,253,190 | Mistral | Aug. 19, 1941 |
| 2,353,503 | Rost et al. | July 11, 1944 |
| 2,474,471 | Dolan II | June 28, 1949 |

FOREIGN PATENTS

| Number | Country | Date |
| --- | --- | --- |
| 487,786 | Great Britain | June 23, 1938 |